(12) United States Patent
Yamano et al.

(10) Patent No.: US 12,634,562 B2
(45) Date of Patent: May 19, 2026

(54) INFORMATION PROCESSING APPARATUS, INFORMATION PROCESSING METHOD, AND INFORMATION PROCESSING SYSTEM

(71) Applicant: Sony Group Corporation, Tokyo (JP)

(72) Inventors: Ikuo Yamano, Tokyo (JP); Osamu Ito, Tokyo (JP); Ryo Yokoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 137 days.

(21) Appl. No.: 18/683,599

(22) PCT Filed: Mar. 17, 2022

(86) PCT No.: PCT/JP2022/012442
§ 371 (c)(1),
(2) Date: Feb. 14, 2024

(87) PCT Pub. No.: WO2023/032308
PCT Pub. Date: Mar. 9, 2023

(65) Prior Publication Data
US 2024/0357215 A1     Oct. 24, 2024

(30) Foreign Application Priority Data
Aug. 30, 2021     (JP) ................................. 2021-140071

(51) Int. Cl.
*H04N 21/8547*     (2011.01)
*G06F 3/01*     (2006.01)
(52) U.S. Cl.
CPC ......... *H04N 21/8547* (2013.01); *G06F 3/016* (2013.01)

(58) Field of Classification Search
CPC ........... H04N 21/8547; H04N 21/4131; H04N 21/44; G06F 3/016; G06F 3/01; H04R 1/00; H04R 1/10; H04R 3/00
See application file for complete search history.

(56) References Cited

U.S. PATENT DOCUMENTS

| | | | |
|---|---|---|---|
| 10,609,677 B2 * | 3/2020 | Miller | ................... H04W 68/02 |
| 10,782,779 B1 * | 9/2020 | Eubank | ................... G06F 3/167 |
| 12,177,911 B2 * | 12/2024 | Xue | ....................... H04L 65/70 |

(Continued)

FOREIGN PATENT DOCUMENTS

| | | |
|---|---|---|
| JP | 2018-019393 A | 2/2018 |
| JP | 2021-093578 A | 6/2021 |
| WO | WO 2019/013055 A1 | 1/2019 |

*Primary Examiner* — Fernando Alcon
(74) *Attorney, Agent, or Firm* — Paratus Law Group, PLLC

(57) ABSTRACT

An information processing apparatus includes an estimation processing unit that estimates at least some of a video latency time from a reproduction instruction of a video signal to video presentation based on the video signal, an acoustic latency time from a reproduction instruction of an acoustic signal to acoustic presentation based on the acoustic signal, and a haptic sense latency time from a reproduction instruction of a haptic signal to haptic sense presentation based on the haptic signal, and a latency time determination unit that determines an additional latency time related to the haptic sense presentation on the basis of an estimation result of the estimation processing unit.

17 Claims, 10 Drawing Sheets

(56)     References Cited

U.S. PATENT DOCUMENTS

| 2010/0039244 | A1* | 2/2010 | Tschirhart | B60W 50/16 |
| | | | | 340/384.7 |
| 2014/0143692 | A1* | 5/2014 | Wigdor | G06F 9/451 |
| | | | | 715/764 |
| 2017/0064154 | A1* | 3/2017 | Tseng | H04N 21/8547 |
| 2019/0064924 | A1* | 2/2019 | Nocon | G06F 3/147 |
| 2019/0215349 | A1* | 7/2019 | Adams | A63F 13/327 |
| 2019/0227628 | A1* | 7/2019 | Rand | G06F 3/167 |
| 2021/0096656 | A1* | 4/2021 | Gilg | G08B 7/06 |
| 2024/0078076 | A1* | 3/2024 | Lee | G06F 3/165 |

* cited by examiner

DVA
DVB
D1 { DAA
DHA
DHB 11
12
21
21
D2 (DAB)

*FIG. 5*

| FIRST DEVICE | SECOND DEVICE | ACOUSTIC CODEC | VIDEO LATENCY TIME | ACOUSTIC LATENCY TIME | TOTAL HAPTIC SENSE LATENCY TIME | |
|---|---|---|---|---|---|---|
| | | | | | HAPTIC SENSE LATENCY TIME | ADDITIONAL LATENCY TIME |
| D V A<br>D V B<br>D A A<br>D H A<br>D H B | D A B | CODEC A | 0 | 220 | 0 | 170 |
| | | CODEC B | 0 | 40 | 0 | 30 |
| | | UNKNOWN | 0 | 100 | 0 | 120 |

*FIG. 6*

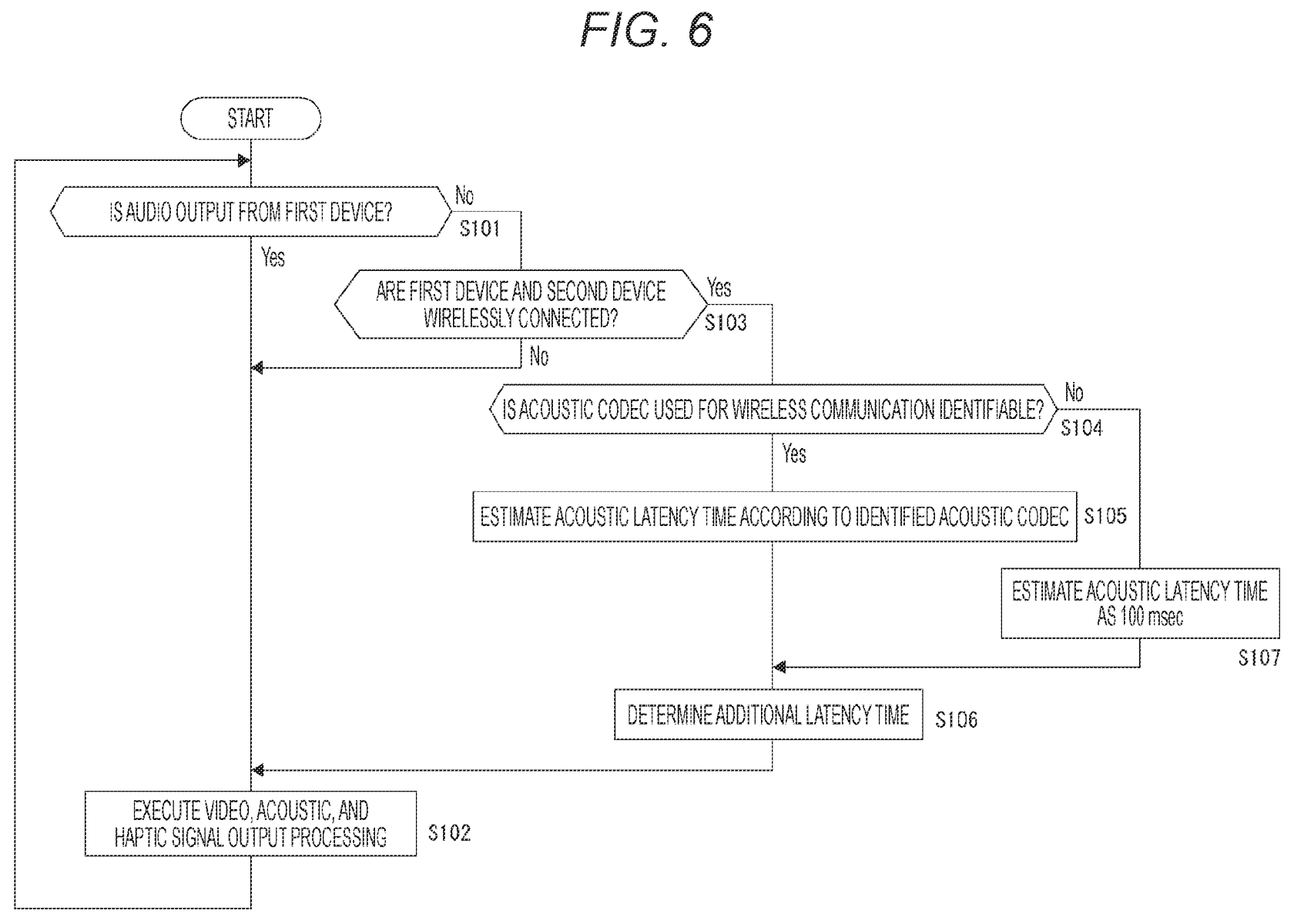

START

S101 — IS AUDIO OUTPUT FROM FIRST DEVICE?

No → (loop)
Yes →

S103 — ARE FIRST DEVICE AND SECOND DEVICE WIRELESSLY CONNECTED?

No →
Yes →

S104 — IS ACOUSTIC CODEC USED FOR WIRELESS COMMUNICATION IDENTIFIABLE?

No →
Yes →

S105 — ESTIMATE ACOUSTIC LATENCY TIME ACCORDING TO IDENTIFIED ACOUSTIC CODEC

S107 — ESTIMATE ACOUSTIC LATENCY TIME AS 100 msec

S106 — DETERMINE ADDITIONAL LATENCY TIME

S102 — EXECUTE VIDEO, ACOUSTIC, AND HAPTIC SIGNAL OUTPUT PROCESSING

1A CONTENT REPRODUCTION SYSTEM

*FIG. 9*

| THIRD DEVICE | FOURTH DEVICE | FIFTH DEVICE | VIDEO LATENCY TIME | ACOUSTIC LATENCY TIME | TOTAL HAPTIC SENSE LATENCY TIME | |
|---|---|---|---|---|---|---|
| | | | | | HAPTIC SENSE LATENCY TIME | ADDITIONAL LATENCY TIME |
| D V A<br>D A A<br>D H A | D V B<br>D A B | | 80 | 80 | 50 | 30 |
| | | D H B | 100 | 100 | 50 | 70 |

INFORMATION PROCESSING APPARATUS, INFORMATION PROCESSING METHOD, AND INFORMATION PROCESSING SYSTEM

CROSS REFERENCE TO PRIOR APPLICATION

This application is a National Stage Patent Application of PCT International Patent Application No. PCT/JP2022/012442 (filed on Mar. 17, 2022) under 35 U.S.C. § 371, which claims priority to Japanese Patent Application No. 2021-140071 (filed on Aug. 30, 2021), which are all hereby incorporated by reference in their entirety.

TECHNICAL FIELD

The present technology relates to technical fields of an information processing apparatus, an information processing method, and an information processing system for adjusting timing of haptic sense presentation.

BACKGROUND ART

When content is provided to a viewer/listener, presentation of different types of stimuli without discomfort enables a high-quality user experience to be provided. For example, in a case where a visual stimulus based on video, an auditory stimulus based on audio, and a haptic stimulus based on vibration are not synchronized, or in a case where presentation order is unnatural, there is a possibility that the viewer/listener feels discomfort and fails to enjoy the content.

In view of such a situation, for example, Patent Document 1 set out below discloses a technique of synchronously presenting an auditory stimulus based on a sound or the like and a haptic stimulus based on vibration by measuring an actual latency time related to reproduction of the voice or the like.

CITATION LIST

Patent Document

Patent Document 1: Japanese Patent Application Laid-Open No. 2018-019393

SUMMARY OF THE INVENTION

Problems to be Solved by the Invention

However, it is not always possible to measure the latency time. Thus, the technique described in Patent Document 1 fails to exert the effect in a system not capable of measuring the latency time.

The present technology has been conceived in view of such a problem, and aims to perform content reproduction for providing a high-quality user experience in a system not capable of measuring a latency time.

Solutions to Problems

An information processing apparatus according to the present technology includes an estimation processing unit that estimates at least some of a video latency time from a reproduction instruction of a video signal to video presentation based on the video signal, an acoustic latency time from a reproduction instruction of an acoustic signal to acoustic presentation based on the acoustic signal, and a haptic sense latency time from a reproduction instruction of a haptic signal to haptic sense presentation based on the haptic signal, and a latency time determination unit that determines an additional latency time related to the haptic sense presentation on the basis of the video latency time, the acoustic latency time, and the haptic sense latency time.

The acoustic presentation and the haptic sense presentation may cause a viewer/listener to feel discomfort depending on a time lag and order thereof. In order to eliminate or suppress such discomfort, it is conceivable to provide a temporal difference between timing of the reproduction instruction of the acoustic signal and timing of the reproduction instruction of the haptic signal.

BRIEF DESCRIPTION OF DRAWINGS

FIG. 5 is a table illustrating an example of each estimated latency time and determined additional latency time according to the first embodiment.

FIG. 6 is a flowchart illustrating an exemplary flow of a process executed by a control unit according to the first embodiment.

FIG. 9 is a table illustrating an example of each estimated latency time and determined additional latency time according to the second embodiment.

MODE FOR CARRYING OUT THE INVENTION

Hereinafter, embodiments according to the present technology will be described in the following order with reference to the accompanying drawings.

<1. System configuration>
<2. Computer device>
<3. Additional latency time determination>
<4. Processing flow>
<5. Second Embodiment>
<6. Additional latency time determination in second embodiment>
<7. Processing flow in second embodiment>
<8. Variations>
<9. Conclusion>
<10. Present technology>

1. System Configuration

A first embodiment of a configuration of a content reproduction system 1 according to the present embodiment will be described with reference to FIG. 1.

The content reproduction system 1 includes a video signal output device DVA that outputs a video signal Sv, a video presentation device DVB that performs video presentation based on the video signal Sv, an acoustic signal output device DAA that outputs an acoustic signal Sa, an acoustic presentation device DAB that performs acoustic presentation based on the acoustic signal Sa, a haptic signal output device DHA that outputs a haptic signal Sh, and a haptic sense presentation device DHB that performs haptic sense presentation based on the haptic signal Sh.

Figure 1:
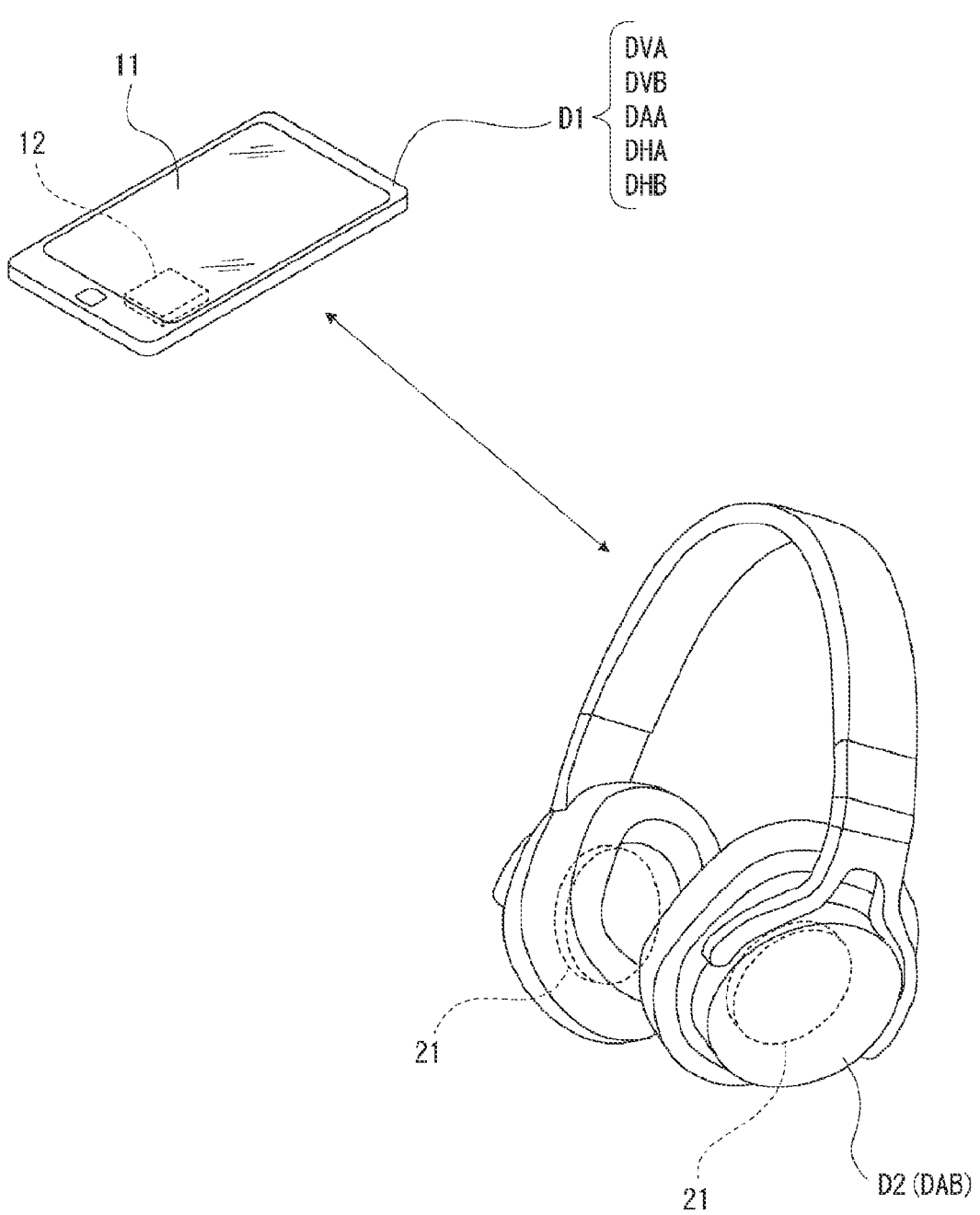
FIG. 1 is a diagram for explaining an outline of a content reproduction system, and is a diagram of a content reproduction system according to a first embodiment.

In the example illustrated in FIG. 1, the content reproduction system 1 includes two devices of a first device D1 and a second device D2.

The first device D1 has a function of the video signal output device DVA, a function of the video presentation device DVB, a function of the acoustic signal output device DAA, a function of the haptic signal output device DHA, and a function of the haptic sense presentation device DHB. In other words, the first device D1 is a device that outputs the video signal Sv, the acoustic signal Sa, and the haptic signal Sh, and performs video and audio presentation.

The second device D2 has a function of the acoustic presentation device DAB. In other words, the second device D2 is a device that performs acoustic presentation according to the acoustic signal Sa output from the first device D1.

The first device D1 is a mobile terminal device such as a smartphone, a tablet terminal, or the like. In addition, the second device D2 is a device such as a headphone, an earphone, or the like.

Specifically, video based on the video signal Sv is displayed on a display unit 11 included in the first device D1, thereby providing a visual stimulus to the viewer/listener (user). Furthermore, a vibrator 12 included in the first device D1 vibrates so that the entire first device D1 vibrates, thereby providing a haptic stimulus based on the haptic signal Sh to the viewer/listener.

Furthermore, a speaker 21 included in the second device D2 vibrates, thereby outputting audio based on the acoustic signal Sa to the user.

Figure 2:
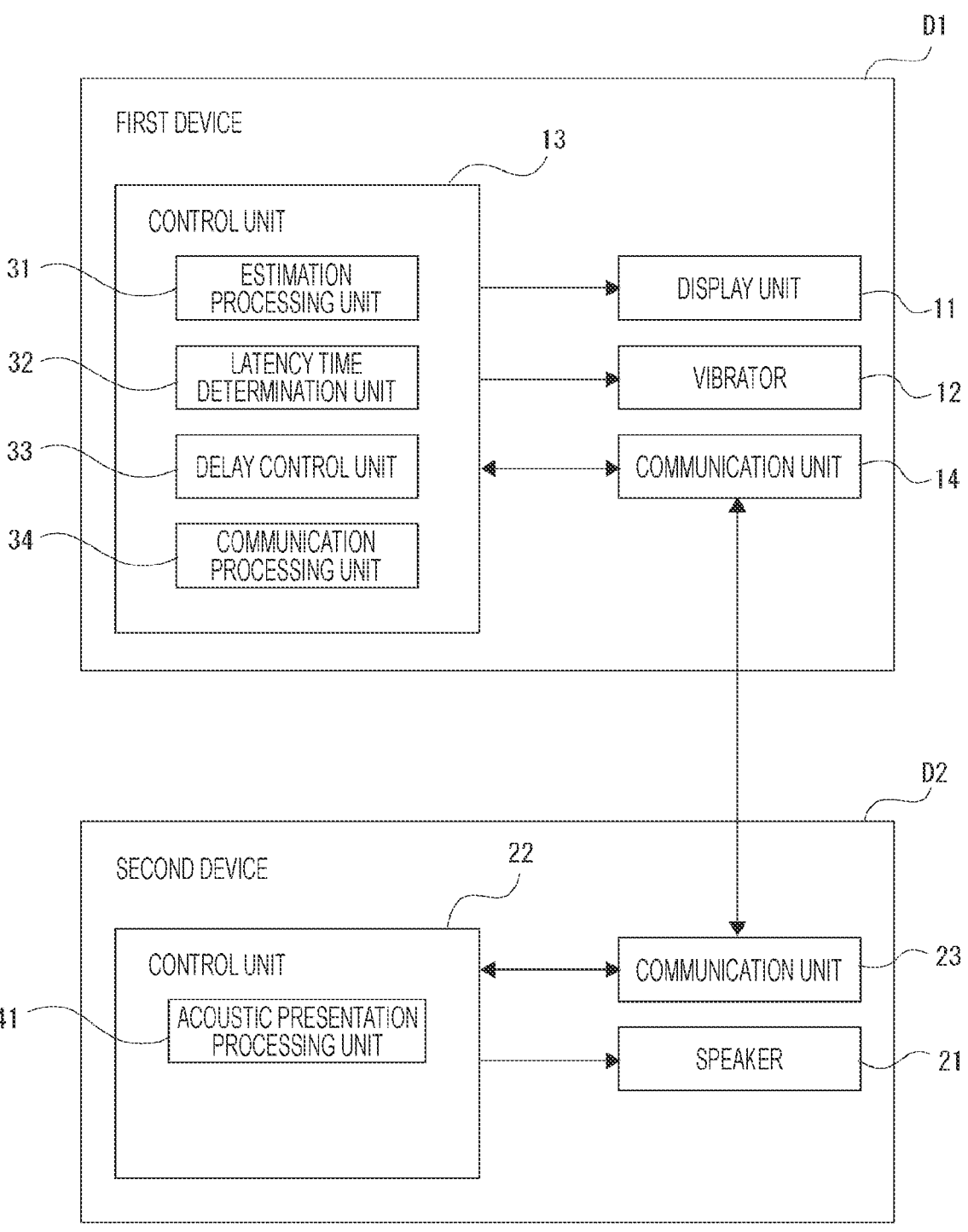
FIG. 2 is a block diagram illustrating configurations of a first device and a second device according to the first embodiment.

In such a configuration, as illustrated in FIG. 2, for example, various programs are executed by a control unit 13 included in the first device D1, thereby implementing the video presentation and the haptic sense presentation in the first device D1 and the acoustic presentation by in the second device D2.

Specifically, the first device D1 includes a control unit 13 and a communication unit 14 in addition to the display unit 11 and the vibrator 12.

The control unit 13 includes an estimation processing unit 31, a latency time determination unit 32, a delay control unit 33, and a communication processing unit 34.

The estimation processing unit 31 performs processing of estimating a latency time L from when a reproduction instruction of various signals related to content is issued to when various stimuli are presented to the viewer/listener.

The latency time L is set for each stimulus type. Specifically, a time from when a reproduction instruction of the video signal Sv is issued to when the video based on the video signal Sv is actually displayed on the display unit 11 is referred to as a "video latency time Lv", a time from when a reproduction instruction of the acoustic signal Sa is issued to when the acoustic presentation is carried out in the second device D2 on the basis of the acoustic signal Sa is referred to as an "acoustic latency time La", and a time from when a reproduction instruction of the haptic signal Sh is issued to when the haptic sense presentation based on the vibration of the vibrator 12 is carried out is referred to as a "haptic sense latency time Lh".

Note that the "reproduction instruction" indicates an instruction to execute reproduction processing for presenting various stimuli to the viewer/listener, and various forms are conceivable. For example, pressing of a reproduction button of the content by the viewer/listener may be regarded as a reproduction instruction, or issuance of a command for starting signal reproduction to each device or each unit by the control unit 13, which is to provide various stimuli according to the instruction of the viewer/listener, may be regarded as a reproduction instruction.

Furthermore, signal output to a device or a unit that reproduces various signals may be regarded as a reproduction instruction.

Various methods for estimating the latency time L may be considered. For example, in a case where signals are exchanged between devices wirelessly, the latency time L may be estimated by specifying a type (codec) of an encoding scheme or a decoding scheme in wireless communication. Furthermore, device specification information, such as a manufacturer, a model number, or the like of the device, may be used to specify the encoding scheme or the like and to estimate the latency time of the entire system.

Using the acoustic signal Sa as an example, the acoustic latency time La is estimated to be 220 msec in a case where the acoustic signal Sa is encoded and decoded by a sub band codec (SBC). Furthermore, the acoustic latency time La is estimated to be 40 msec in a case where the acoustic signal Sa is encoded and decoded by a codec with a low latency for the acoustic signal Sa.

Those acoustic latency times La are merely estimated values, and are assumed to be different from actual measured values. Since there is no need to actually measure the latency time, a processing load of the first device D1 is reduced.

Furthermore, the acoustic latency time La based on the SBC or a low-latency codec is assumed to include a time required for packetization, a time required to extract data from a packet, and a communication latency time.

In addition, the actual acoustic latency time La further includes a time required for acoustic reproduction processing and the like.

Also for the video signal Sv and the haptic signal Sh, the video latency time Lv and the haptic sense latency time Lh are estimated as appropriate depending on a codec to be handled.

Note that the estimation processing unit 31 may estimate each latency time L depending on a device connection mode.

For example, in a case where the video signal output device DVA and the video presentation device DVB are the same device (first device D1) as illustrated in FIG. 1, no communication delay occurs between the devices, and thus the video latency time Lv may be estimated to be 0 msec.

At this time, the video latency time Lv may be estimated to be several milliseconds or several tens of milliseconds in consideration of a processing time related to video display.

Note that the haptic sense latency time Lh may be considered in a similar manner.

For example, in the first embodiment illustrated in FIGS. 1 and 2, the estimation processing unit 31 estimates the acoustic latency time La to be 220 msec, and estimates both the video latency time Lv and the haptic sense latency time Lh to be 0 msec.

Note that the estimation processing unit 31 estimates at least some of the latency times L among the video latency time Lv, the acoustic latency time La, and the haptic sense latency time Lh. In addition, actual measured values may be used for other latency times L instead of estimated values.

The latency time determination unit 32 determines an additional latency time Lh', which is an additional latency time related to the haptic sense presentation. The additional latency time Lh' is a latency time L to be intentionally incorporated depending on processing, unlike the haptic sense latency time Lh that inevitably occurs due to the device configuration.

That is, the haptic sense presentation to the viewer/listener is carried out after a total haptic sense latency time LH, which is obtained by adding the haptic sense latency time Lh and the additional latency time Lh', has elapsed from the reproduction instruction of the haptic signal Sh.

The latency time determination unit 32 determines the additional latency time Lh' such that the total haptic sense latency time LH is not smaller than the acoustic latency time La, that is, the haptic sense presentation is not carried out before the acoustic presentation. Specifically, a time length from the acoustic presentation to the haptic sense presentation is set not to exceed a first time T1 (e.g., 50 msec).

The additional latency time Lh' may be determined by being calculated, or may be determined by being selected from a table depending on a condition.

Furthermore, the latency time determination unit 32 determines the additional latency time Lh' such that the total haptic sense latency time LH does not become too long with respect to the video latency time Lv, that is, the haptic sense presentation is not too delayed with respect to the video presentation. Specifically, a time length from the video presentation to the haptic sense presentation is set not to exceed a second time T2 (e.g., 200 msec).

The second time T2 is set to be longer than the first time T1.

The delay control unit 33 controls a delay of the haptic signal Sh with respect to the video signal Sv and the acoustic signal Sa. Note that the output timing of the haptic signal Sh is determined according to the additional latency time Lh' described above.

The communication processing unit 34 performs encoding processing, packetizing processing, and the like on each signal output at predetermined timing under the delay control of the delay control unit 33, and outputs the signal to the communication unit 14.

The communication unit 14 transmits packetized information to the second device D2 on the basis of the processing of the communication processing unit 34.

Note that the packetizing processing may be executed by the communication unit 14.

The communication processing unit 34 performs processing of receiving music data, video data, and the like as content from another information processing apparatus, such as a server device, and the like. The communication unit 14 implements communication processing corresponding thereto.

Note that the first device D1 may include an acoustic presentation processing unit. In addition, a case of performing acoustic presentation from the acoustic presentation processing unit of the first device D1 and a case of performing acoustic presentation from the second device D2, such as a headphone connected to the first device D1, may be selectable. For example, in a case where wireless communication for the acoustic signal Sa is established between the first device D1 and the second device D2, the acoustic presentation may be performed by the second device D2, and in a case where the wireless communication is disconnected, the acoustic presentation may be performed by the acoustic presentation processing unit of the first device D1.

As illustrated in FIG. 2, the second device D2 includes a control unit 22 and a communication unit 23 in addition to the speaker 21.

The control unit 22 includes an acoustic presentation processing unit 41.

The acoustic presentation processing unit 41 performs processing of receiving packet data of the acoustic signal Sa received from the first device D1, processing of extracting the acoustic signal Sa from the packet data, and the like.

In addition, the acoustic presentation processing unit 41 performs acoustic presentation by vibrating the speaker 21 on the basis of the extracted acoustic signal Sa.

The communication unit 23 receives the packet data from the first device D1 by wired or wireless communication.

2. Computer Device

A configuration of a computer device including an arithmetic processing unit that implements the first device D1 and the second device D2 described above will be described with reference to FIG. 3.

A central processing unit (CPU) 71 of the computer device functions as the arithmetic processing unit that performs the various type of processing described above, and executes the various type of processing in accordance with a program stored in a ROM 72 or a nonvolatile memory unit 74, such as an electrically erasable programmable read-only memory (EEP-ROM), or a program loaded from a storage unit 79 to a RAM 73. The RAM 73 also appropriately stores data and the like necessary for the CPU 71 to execute the various types of processing.

The CPU 71, the ROM 72, the RAM 73, and the nonvolatile memory unit 74 are mutually connected via a bus 83. An input/output interface (I/F) 75 is also connected to the bus 83.

An input unit 76 including a manipulation element and an operation device is connected to the input/output interface 75.

For example, as the input unit 76, various types of manipulation elements and operation devices such as a keyboard, a mouse, a key, a dial, a touch panel, a touch pad, a remote controller, and the like are assumed.

A user operation is detected by the input unit 76, and a signal corresponding to the input operation is interpreted by the CPU 71.

Furthermore, a display unit 77 including a liquid crystal display (LCD), an organic electro-luminescence (EL) panel, or the like, and a voice output unit 78 including a speaker or the like are integrally or separately connected to the input/output interface 75.

The display unit 77 is a display unit that performs various types of display, and includes, for example, a display device provided in the housing of the computer device, a separate display device connected to the computer device, or the like.

The display unit 77 executes display of an image for various types of image processing, a moving image to be processed, and the like on a display screen on the basis of an instruction from the CPU 71. In addition, the display unit 77 displays various types of operation menus, icons, messages, and the like, that is, performs display as a graphical user interface (GUI), on the basis of the instruction from the CPU 71.

In some cases, the storage unit 79 including a hard disk, a solid-state memory, or the like, and a communication unit 80 including a modem or the like are connected to the input/output interface 75.

The communication unit 80 performs communication processing via a transmission path such as the Internet, wired/wireless communication with various types of devices, or communication based on bus communication or the like.

A drive 81 is further connected to the input/output interface 75 as necessary, and a removable storage medium 82, such as a magnetic disk, an optical disk, a magneto-optical disk, a semiconductor memory, or the like is mounted as appropriate.

A data file, such as a program to be used for each processing, or the like may be read from the removable storage medium 82 by the drive 81. The read data file is stored in the storage unit 79, and an image and a sound included in the data file are output by the display unit 77 and the voice output unit 78. Furthermore, a computer program or the like read from the removable storage medium 82 are installed in the storage unit 79 as necessary.

In this computer device, for example, software for the processing of the present embodiment may be installed via network communication by the communication unit 80 or via the removable storage medium 82. Alternatively, the software may be stored in advance in the ROM 72, the storage unit 79, or the like.

The CPU 71 executes information processing and communication processing necessary for the first device D1 and the second device D2 including the arithmetic processing unit described above by executing processing operations on the basis of the various programs.

Figure 3:
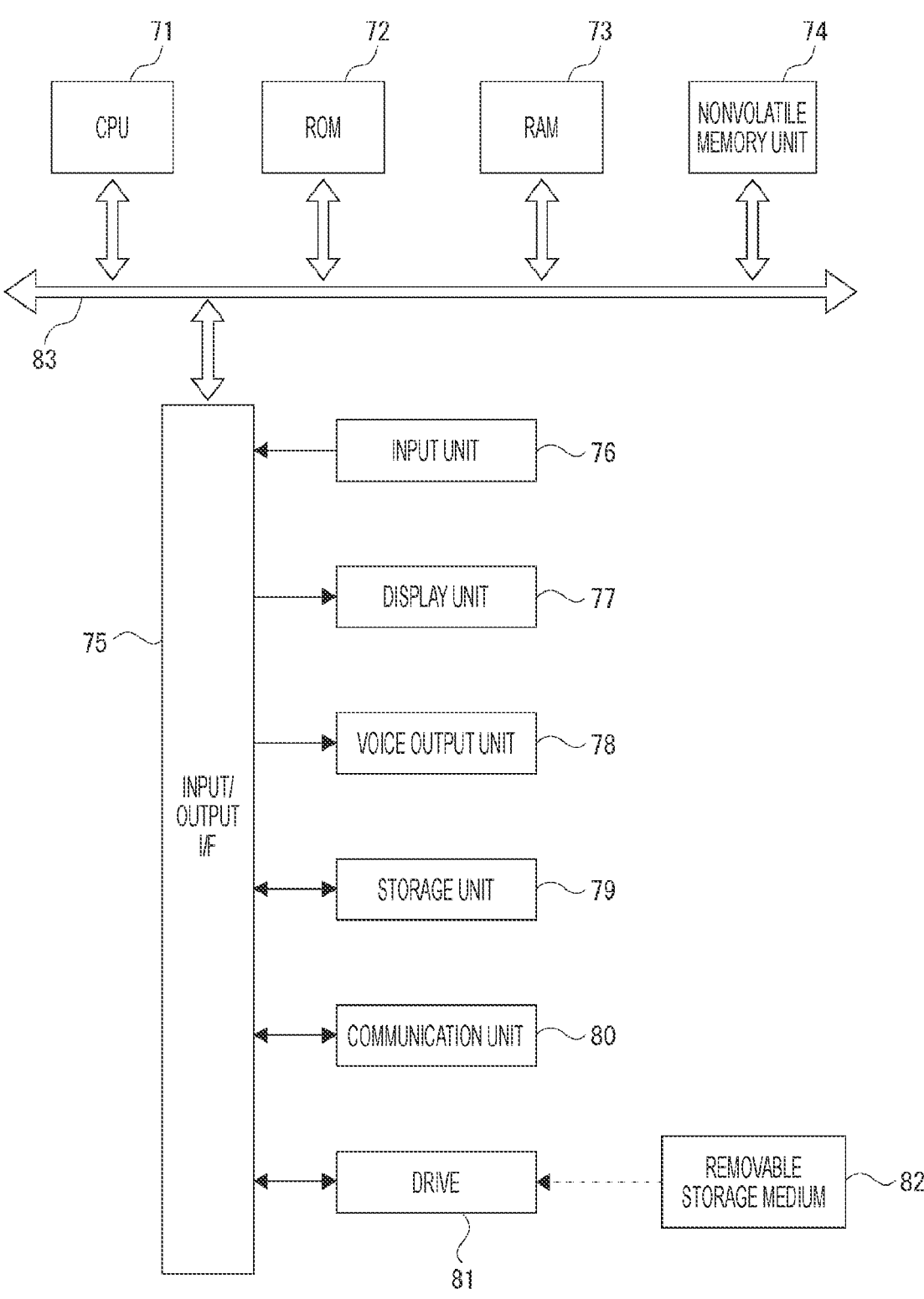
FIG. 3 is a block diagram of a computer device.

Note that the first device D1 and the second device D2 are not limited to a single computer device as illustrated in FIG. 3, and may be configured by a plurality of computer devices being systematized. The plurality of computer devices may be systematized by a local area network (LAN) or the like, or may be disposed in a remote place by a virtual private network (VPN) or the like using the Internet or the like. The plurality of computer devices may include a computer device as a server group (cloud) that may be used by a cloud computing service.

Furthermore, the first device D1 and the second device D2 may not include all the components illustrated in FIG. 3. For example, the second device D2 as a headphone device may be configured without including the display unit 77, the drive 81, and the like.

Similarly, a third device D3, a fourth device D4, and a fifth device D5 to be described later include at least a part of the configuration illustrated in FIG. 3.

3. Additional Latency Time Determination

Determination of an additional latency time to be used to adjust a time lag between video presentation, acoustic presentation, and haptic sense presentation will be described with some examples.

Figure 4:
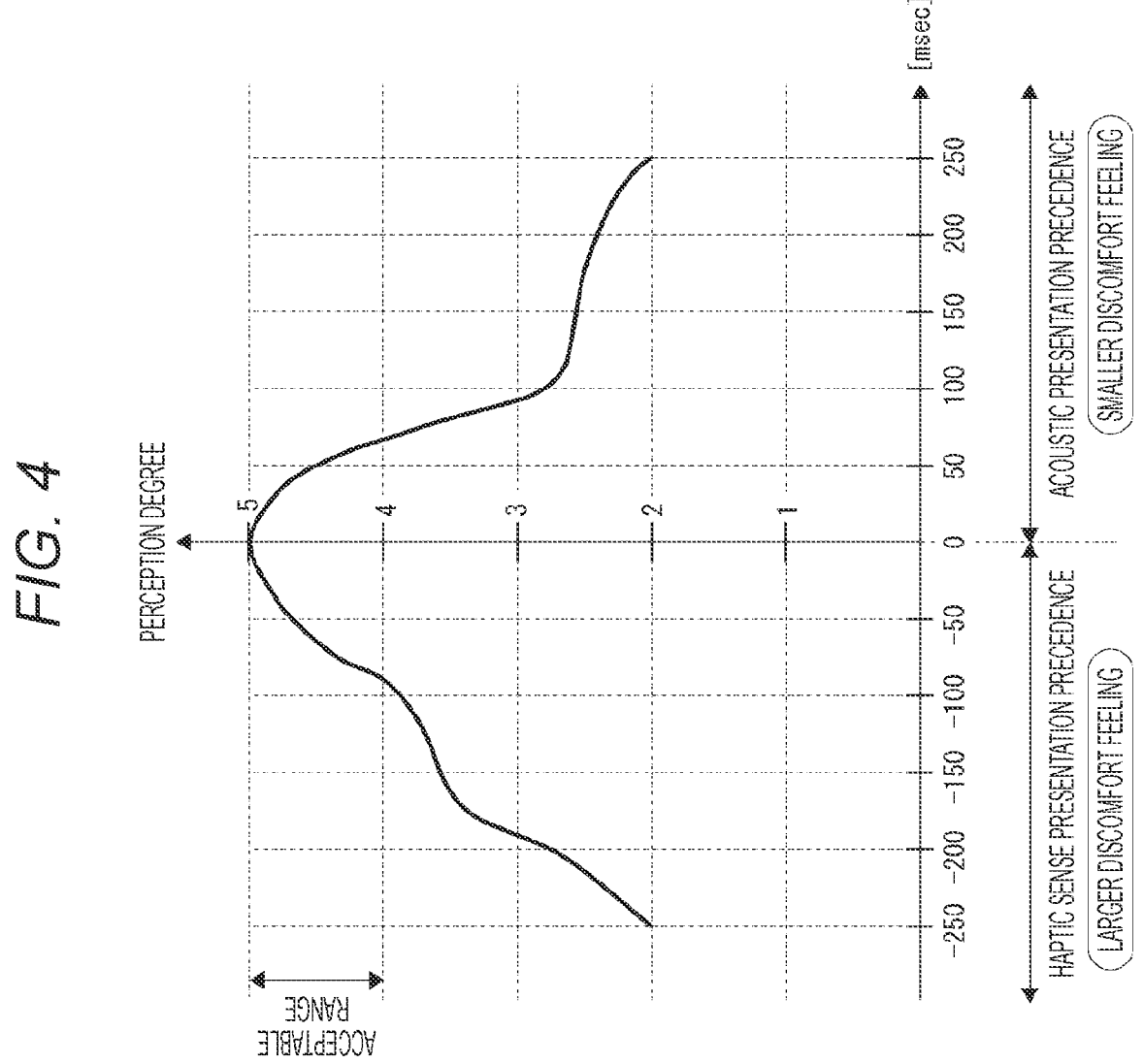
FIG. 4 is a graph illustrating a gap between acoustic presentation and haptic sense presentation and viewer/listener's perception of the gap.

First, FIG. 4 illustrates a graph presenting a gap between the acoustic presentation and the haptic sense presentation and the viewer/listener's perception of the gap.

FIG. 4 is a graph in which a horizontal axis represents a delay amount (msec) of the haptic sense presentation with respect to the acoustic presentation, and a vertical axis represents a degree of perception of the viewer/listener with respect to the delay.

The degree of perception of the viewer/listener with respect to the delay is indicated in five levels. As a status of the degree of perception, "5" indicates "no perceptible delay", "4" indicates "slight perceptual delay", "3" indicates "perceptual delay", "2" indicates "perceptual delay with strange feeling", and "1" indicates "perceptual delay with strong strange feeling".

As illustrated in the drawing, if the time lag between the acoustic presentation and the haptic sense presentation is equal to or smaller than 50 msec, it can be said that the time lag falls within an acceptable range in which the viewer/listener feels no uncomfortableness or discomfort.

Furthermore, it is characterized in that a discomfort feeling is smaller when the acoustic presentation precedes the haptic sense presentation rather than the other way round. This is because a phenomenon in which vibration is transmitted after a sound is heard may occur on a daily basis, whereas a phenomenon in which a sound is heard after vibration is felt is hardly experienced in daily life, and is difficult to intuitively understand.

Thus, in a case of performing the acoustic presentation and the haptic stimulus presentation such that the viewer/listener does not feel discomfort or uncomfortableness, it is more preferable to delay the haptic sense presentation with respect to the acoustic presentation rather than the other way round.

Furthermore, an acceptable deviation amount of a deviation of the acoustic presentation or the haptic sense presentation with respect to the video presentation is larger than a deviation of the haptic sense presentation with respect to the acoustic presentation.

Thus, in a case where a time lag occurs in presentation of each stimulus, the order in which the video presentation is performed first, the acoustic presentation is performed next, and then the haptic sense presentation is performed is more preferable than the other order.

Note that, in daily life, it is usual to feel audio or vibration after video is visually recognized first. Therefore, it is preferable that the acoustic presentation and the haptic sense presentation do not precede the video presentation.

The latency time determination unit 32 determines the additional latency time Lh' described above such that the video presentation, the acoustic presentation, and the haptic sense presentation are presented to the viewer/listener in predetermined order to a maximum extent.

FIG. 5 illustrates an example of the additional latency time Lh' determined by the latency time determination unit 32. Note that the units of the latency time L in the drawing are all msec.

Since the signal output devices and the presentation devices related to the video and the haptic sense are the same device (first device D1) in the first embodiment, both the video latency time Lv and the haptic sense latency time Lh are small, and are set to 0 msec here for simplicity.

In addition, the acoustic latency time La is estimated according to a type of an acoustic codec. Specifically, in a case where the acoustic codec is a standard codec such as an SBC (referred to as a codec A here), the latency time is longer, and is estimated to be 220 msec here. It is estimated to be 40 msec in a case where the acoustic codec is a low-latency codec (referred to as a codec B here), and is estimated to be 100 msec in a case where the acoustic codec is unknown.

In a case where the acoustic codec is the codec A, the latency time determination unit 32 determines the additional latency time Lh' to be 170 msec. This value is set to be longer than the estimated acoustic latency time La, which is due to the fact that the viewer/listener feels no uncomfortableness or discomfort when the time lag between the acoustic presentation and the haptic sense presentation is equal to or smaller than 50 msec as described above. Furthermore, the haptic sense presentation with respect to the video presentation is too delayed if the additional latency time Lh' is set to equal to or longer than 200 msec.

Thus, the additional latency time Lh' is set to 170 msec.

In a case where the acoustic codec is the low-latency codec B, the latency time determination unit 32 determines the additional latency time Lh' to be 40 msec. Since the maximum value of the acoustic latency time La is estimated to be 40 msec, the additional latency time Lh' is set to 40 msec so that the acoustic presentation does not come after the haptic sense presentation even if the acoustic presentation is delayed to the maximum.

Note that a margin may be further added to 40 msec. Specifically, the determined additional latency time Lh' may be 50 msec or 60 msec.

In a case where the acoustic codec cannot be specified and is unknown, the estimation processing unit 31 estimates the acoustic latency time La to be 100 msec. This value is half the value of the case where the acoustic codec is an SBC.

On the basis of this estimated value, the latency time determination unit 32 determines the additional latency time Lh' to be 120 msec. This value is set so that the haptic sense presentation does not excessively precede the acoustic presentation while the time from the video presentation to the haptic sense presentation is suppressed to less than 200 msec.

4. Processing Flow

An exemplary process to be executed by the control unit 13 of the first device D1 according to the first embodiment will be described with reference to a flowchart illustrated in FIG. 6.

In step S101, the control unit 13 determines whether or not the acoustic presentation is performed by the first device D1. This determination processing may be performed on the basis of information input by an operation of the viewer/listener using the first device D1, or may be performed on the basis of detection information obtained by detecting whether or not the second device D2 and the first device D1 are paired.

In a case where it is determined that the acoustic presentation is performed by the first device D1, in step S102, the control unit 13 performs output processing of each of the video signal Sv, the acoustic signal Sa, and the haptic signal Sh. At this time, each of the video latency time Lv, the acoustic latency time La, and the haptic sense latency time Lh is estimated to be 0 msec, and the additional latency time Lh' is determined to be 0 msec.

The processing of step S102 is repeatedly executed until the device that performs the acoustic presentation is changed.

In a case where it is determined that the acoustic presentation is not performed by the first device D1 in step S101, for example, in a case where the acoustic presentation is performed by the second device D2 connected to the first device D1, the control unit 13 determines whether or not the first device D1 and the second device D2 are wirelessly connected in step S103.

In a case where it is determined that the first device D1 and the second device D2 are connected by wire, the control unit 13 proceeds to step S102. That is, each of the video latency time Lv, the acoustic latency time La, and the haptic sense latency time Lh is estimated to be 0 msec, the additional latency time Lh' is determined to be 0 msec, and then the output processing based on each signal is executed.

On the other hand, in a case where it is determined that the first device D1 and the second device D2 are wirelessly connected in step S103, the control unit 13 proceeds to determination processing of step S104.

In step S104, the control unit 13 determines whether or not the acoustic codec to be used for the wireless communication can be specified.

For example, the process proceeds to step S105 in a case where the model numbers of the first device D1 and the second device D2 are known, or in a case where the acoustic codec information can be obtained from the storage unit or the like of the first device D1.

In step S105, the control unit 13 estimates the acoustic latency time La according to the specified acoustic codec. An example of the estimated acoustic latency time La is as illustrated in FIG. 5.

Subsequently, the control unit 13 determines the additional latency time Lh' in step S106. An example of the estimated additional latency time Lh' is as illustrated in FIG. 5.

In step S102, the control unit 13 executes the output processing of each of the video, the audio, and the haptic sense while delaying the output timing of the haptic signal Sh using the additional latency time Lh'.

Furthermore, in a case where it is determined that the acoustic codec to be used for the wireless communication cannot be specified in step S104, the control unit 13 estimates the acoustic latency time La to be 100 msec in step S107.

Thereafter, the control unit 13 determines the additional latency time Lh' according to the estimated acoustic latency time La in step S106, and executes the output processing of each of the video, the audio, and the haptic sense while delaying the output timing of the haptic signal Sh using the additional latency time Lh' in step S102.

5. Second Embodiment

A content reproduction system 1A according to a second embodiment will be described with reference to FIG. 7. Note that, in the following descriptions, descriptions of configurations and processes similar to those in the first embodiment will be omitted as appropriate.

The content reproduction system 1A includes three devices of a third device D3, a fourth device D4, and a fifth device D5.

The fourth device D4 and the fifth device D5 are connected to the third device D3.

For example, the third device D3 is a game machine body, the fourth device D4 is a monitor device, and the fifth device D5 is a game controller.

The third device D3 has a function of a video signal output device DVA, a function of an acoustic signal output device DAA that outputs an acoustic signal Sa, and a function of a haptic signal output device DHA that outputs a haptic signal Sh. That is, the third device D3 outputs signals of each of video, audio, and vibration.

The fourth device D4 has a function of a video presentation device DVB that performs video presentation based on a video signal Sv, and a function of an acoustic presentation device DAB that performs acoustic presentation based on the acoustic signal Sa. That is, the fourth device D4 performs the video presentation and the acoustic presentation on the basis of the video signal Sv and the acoustic signal Sa output from the third device D3.

The fifth device D5 has a function of a haptic sense presentation device DHB that performs haptic sense presentation based on the haptic signal Sh. That is, the fifth device D5 performs the haptic sense presentation on the basis of the haptic signal Sh output from the third device D3.

The fourth device D4 receives the video signal Sv and the acoustic signal Sa from the third device D3, and performs the video presentation and the acoustic presentation. Specifically, the fourth device D4 includes a display unit 11 and a speaker 21, the video based on the video signal Sv is displayed on the display unit 11, and the acoustic presentation based on the acoustic signal Sa is performed through the speaker 21.

The fifth device D5 receives the haptic signal Sh from the third device D3, and performs the haptic sense presentation. Specifically, the fifth device D5 includes a vibrator 12, and the haptic sense presentation based on the haptic signal Sh is carried out by vibration of the vibrator 12.

Figure 8:
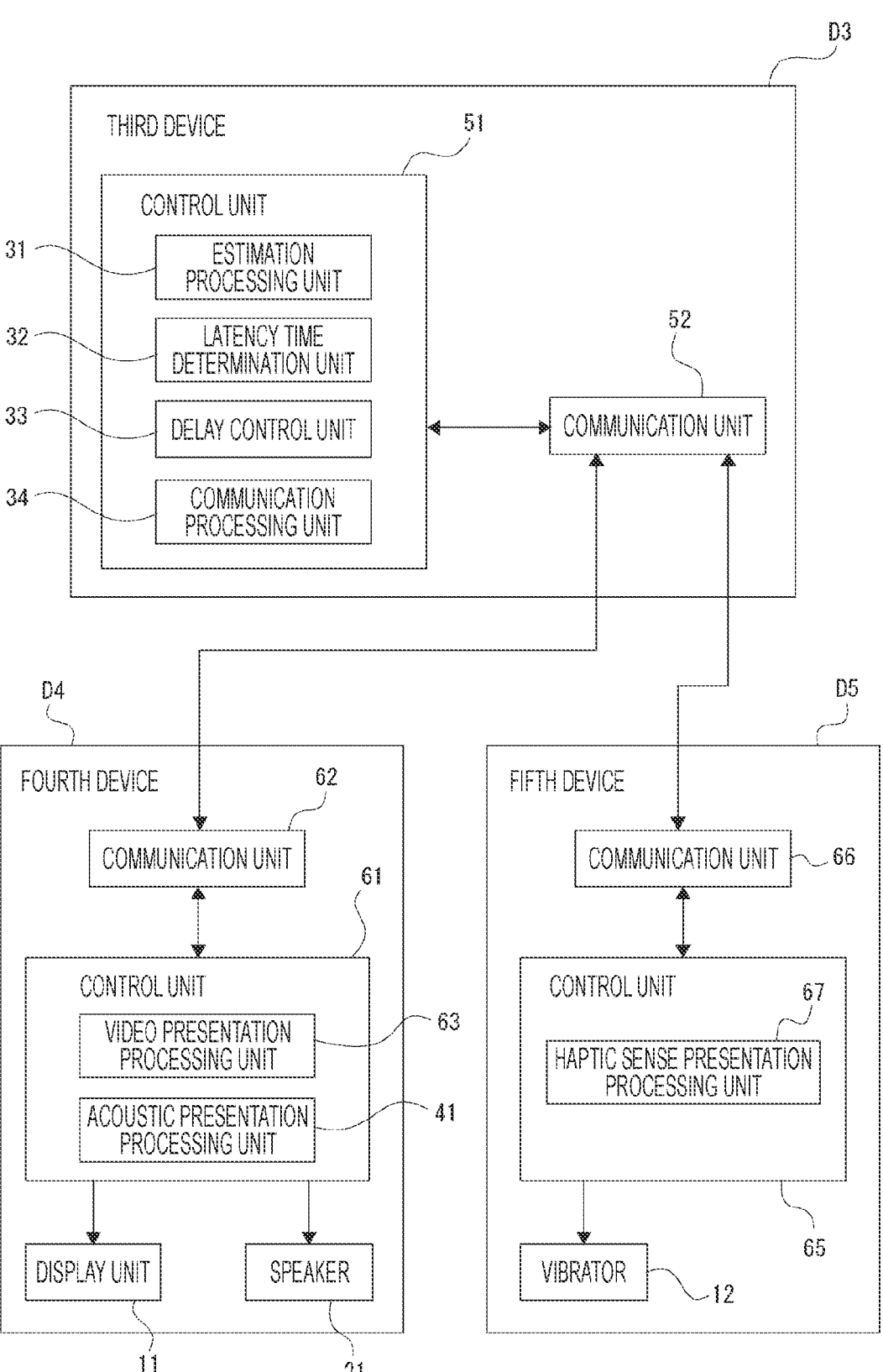
FIG. 8 is a block diagram illustrating configurations of a third device, a fourth device, and a fifth device according to the second embodiment.

FIG. 8 illustrates a specific configuration of the content reproduction system 1A. Note that configurations similar to those in the first embodiment are denoted by the same reference signs, and descriptions thereof will be omitted.

The third device D3 includes a control unit 51 and a communication unit 52. The control unit 51 includes the estimation processing unit 31, the latency time determination unit 32, the delay control unit 33, and the communication processing unit 34 described above. That is, the control unit 51 of the third device D3 has a configuration similar to that of the control unit 13 of the first device D1.

The estimation processing unit 31 estimates a video latency time Lv, an acoustic latency time La, and a haptic sense latency time Lh. Note that a part of the latency time L may be an actual measured value instead of an estimated value.

Figure 7:
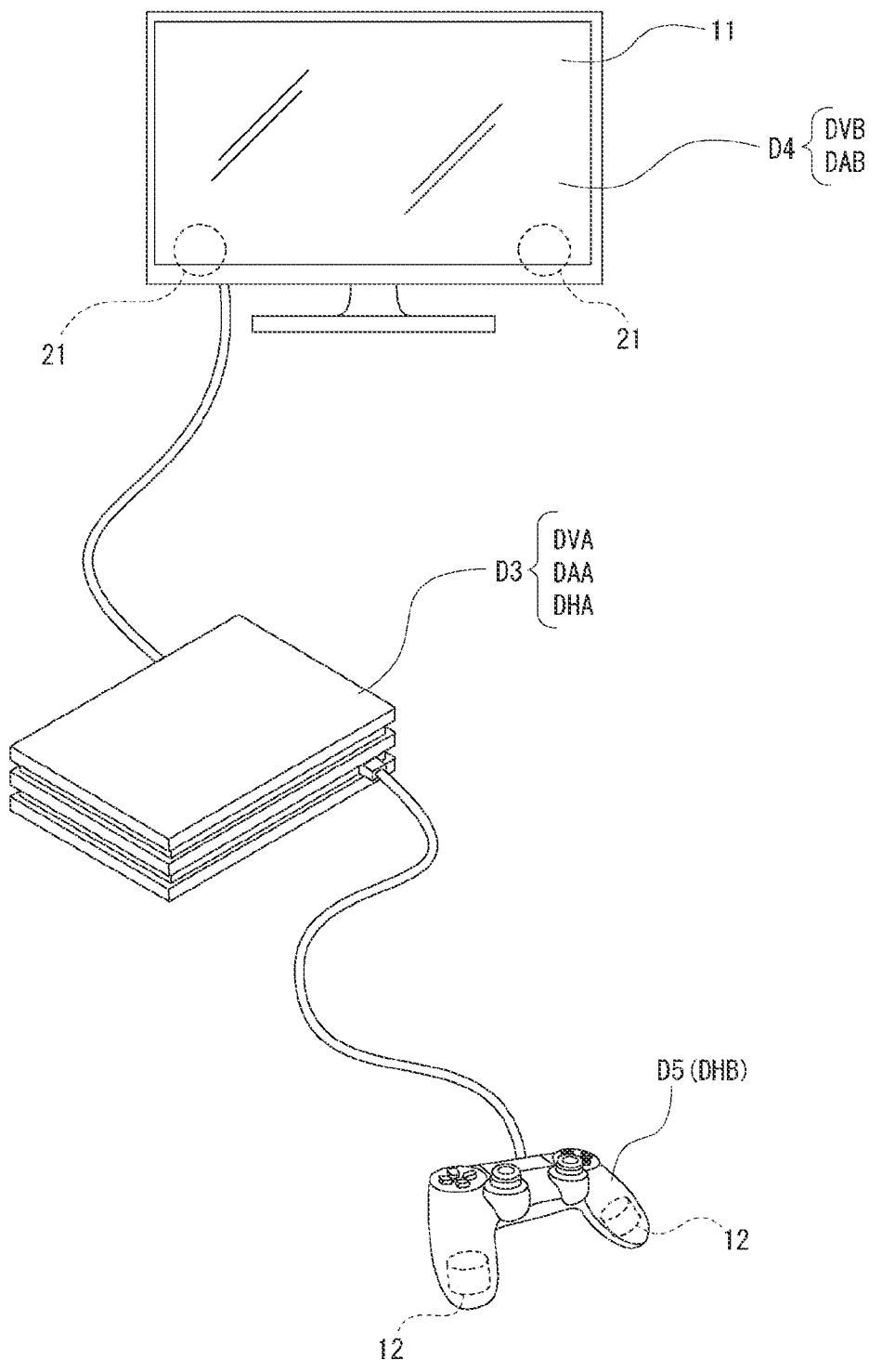
FIG. 7 is a diagram of a content reproduction system according to a second embodiment.

As illustrated in FIG. 7, while the acoustic signal output device DAA and the acoustic presentation device DAB are different devices, they are connected by wire, and thus the acoustic latency time La may be estimated to be 0 msec as described in step S102 and step S103 described above.

However, in the present embodiment, the fourth device D4 is not only the acoustic presentation device DAB but also the video presentation device DVB. Thus, it is conceivable to synchronize the video presentation timing and the acoustic presentation timing in the fourth device D4

Accordingly, it is considered that the fourth device D4 has a latency time L for the processing of extracting and decoding the video signal Sv and the acoustic signal Sa from the received packet data and synchronizing the signals.

Thus, the estimation processing unit 31 specifies an encoding/decoding scheme, a communication speed, and the like used for the video signal Sv and the acoustic signal Sa, and estimates the video latency time Lv and the acoustic latency time La as the same value (e.g., 80 msec) therefrom.

Furthermore, the estimation processing unit 31 estimates the haptic sense latency time Lh according to a configuration mode of the haptic signal output device DHA that outputs the haptic signal Sh and the haptic sense presentation device DHB that performs haptic sense presentation based on the haptic signal Sh.

Specifically, since the haptic signal output device DHA and the haptic sense presentation device DHB are different devices, the haptic sense latency time Lh is estimated to be 50 msec. This numerical value is merely an example, and is appropriately changed depending on an encoding/decoding scheme, a communication speed, and the like used for the haptic signal Sh.

The third device D3 does not include the display unit 11 and the vibrator 12. Thus, the delay control unit 33 performs processing of outputting the video signal Sv and the acoustic signal Sa to the fourth device D4, and processing of outputting the haptic signal Sh to the fifth device D5.

At this time,

The communication unit 52 performs processing of transmitting the video signal Sv and the acoustic signal Sa packetized by the processing of the communication processing unit 34 to the fourth device D4, and processing of transmitting the haptic signal Sh to the fifth device D5.

The fourth device D4 includes a control unit 61 and a communication unit 62 in addition to the display unit 11 and the speaker 21.

The control unit 61 includes a video presentation processing unit 63 and the acoustic presentation processing unit 41 described above. The video presentation processing unit 63 performs processing of receiving packet data of the video signal Sv received from the third device D3, processing of extracting the video signal Sv from the packet data, and the like.

In addition, the video presentation processing unit 63 causes the display unit 11 to display video on the basis of the extracted video signal Sv.

The acoustic presentation processing unit 41 performs processing of receiving packet data of the acoustic signal Sa received from the third device D3, processing of extracting the acoustic signal Sa from the packet data, and the like.

In addition, the acoustic presentation processing unit 41 performs acoustic presentation by vibrating a diaphragm of the speaker 21 on the basis of the extracted acoustic signal Sa.

The fifth device D5 includes a control unit 65 and a communication unit 66 in addition to the vibrator 12. The control unit 65 includes a haptic sense presentation processing unit 67.

The haptic sense presentation processing unit 67 performs processing of receiving packet data of the haptic signal Sh received from the third device D3, processing of extracting the haptic signal Sh from the packet data, and the like.

In addition, the haptic sense presentation processing unit 67 performs haptic sense presentation by vibrating the vibrator 12 on the basis of the extracted haptic signal Sh.

6. Additional Latency Time Determination in Second Embodiment

FIG. 9 illustrates an example of an additional latency time Lh' according to the second embodiment. Note that the units of the latency time L in the drawing are all msec.

In the second embodiment, as described above, the device that outputs the video signal Sv and the acoustic signal Sa and the device that presents a stimulus according to a signal are different devices (third device D3 and fourth device D4), and the devices that present stimuli based on the video signal Sv and the acoustic signal Sa are the same device (fourth device D4), and thus the video latency time Lv and the acoustic latency time La are estimated as numerical values other than 0 msec in consideration of synchronization of the video presentation and the acoustic presentation.

First, data illustrated on the upper side in FIG. 9 will be described. The data is an example of a case where a moving image codec and an acoustic codec used for transmission/reception of the video signal Sv and the acoustic signal Sa can be specified. For example, the estimation processing unit 31 estimates the video latency time Lv and the acoustic latency time La to be 80 msec on the basis of the specified moving image codec and the acoustic codec.

Furthermore, the estimation processing unit 31 estimates the haptic sense latency time Lh to be 50 msec. This value is, for example, a value estimated according to the encoding/decoding scheme, the communication speed, and the like used for the haptic signal Sh.

The latency time determination unit 32 determines the additional latency time Lh' to be 30 msec. This value is determined such that a total haptic sense latency time LH becomes equal to the video latency time Lv and the acoustic latency time La.

Note that, in order to reliably avoid the situation where the haptic sense presentation precedes the acoustic presentation, the additional latency time Lh' may be estimated to be 40 msec or 50 msec so that the value of the total haptic sense latency time LH is slightly delayed from the video latency time Lv and the acoustic latency time La.

Next, data illustrated on the lower side in FIG. 9 will be described. The data is an example of a case where the moving image codec and the acoustic codec used for transmission/reception of the video signal Sv and the acoustic signal Sa cannot be specified. Thus, in this example, both the video latency time Lv and the acoustic latency time La are estimated to be 100 msec. This value may be an average value or a median value of the latency times in a case where various moving image codecs or acoustic codecs are used. Alternatively, it may be a latency time actually measured in response to the fact that the moving image codec and the acoustic codec cannot be specified. Furthermore, it may be a value estimated on the basis of the most frequently used codec.

Furthermore, the estimation processing unit 31 estimates the haptic sense latency time Lh to be 50 msec according to the encoding/decoding scheme, the communication speed, and the like used for the haptic signal Sh.

The latency time determination unit 32 determines the additional latency time Lh' to be 70 msec.

Here, in a case where the additional latency time Lh' is determined such that the total haptic sense latency time LH becomes 100 msec, which is equal to the video latency time Lv and the acoustic latency time La, it is sufficient if the additional latency time Lh' is determined to be 50 msec. However, 100 msec equal to the video latency time Lv and the acoustic latency time La is merely an estimated value, which is estimated as a provisional value in response to the fact that the moving image codec and the acoustic codec cannot be specified. Therefore, it is considered that the actual video latency time Lv and acoustic latency time La may be 80 msec, 120 msec, or the like.

In view of the above, in the present example, the additional latency time Lh' is determined to be 70 msec so that the haptic sense presentation comes after the acoustic presentation.

With this arrangement, the haptic sense presentation is performed after the acoustic presentation if the video latency time Lv and the acoustic latency time La are equal to or smaller than 120 msec. Furthermore, if the video latency time Lv and the acoustic latency time La are equal to or smaller than 170 msec, the time lag between the acoustic presentation and the haptic sense presentation can be suppressed to equal to or less than 50 msec as described above with reference to FIG. 4, whereby the possibility of causing the viewer/listener to feel uncomfortableness or discomfort may be reduced.

7. Processing Flow in Second Embodiment

Figure 10:
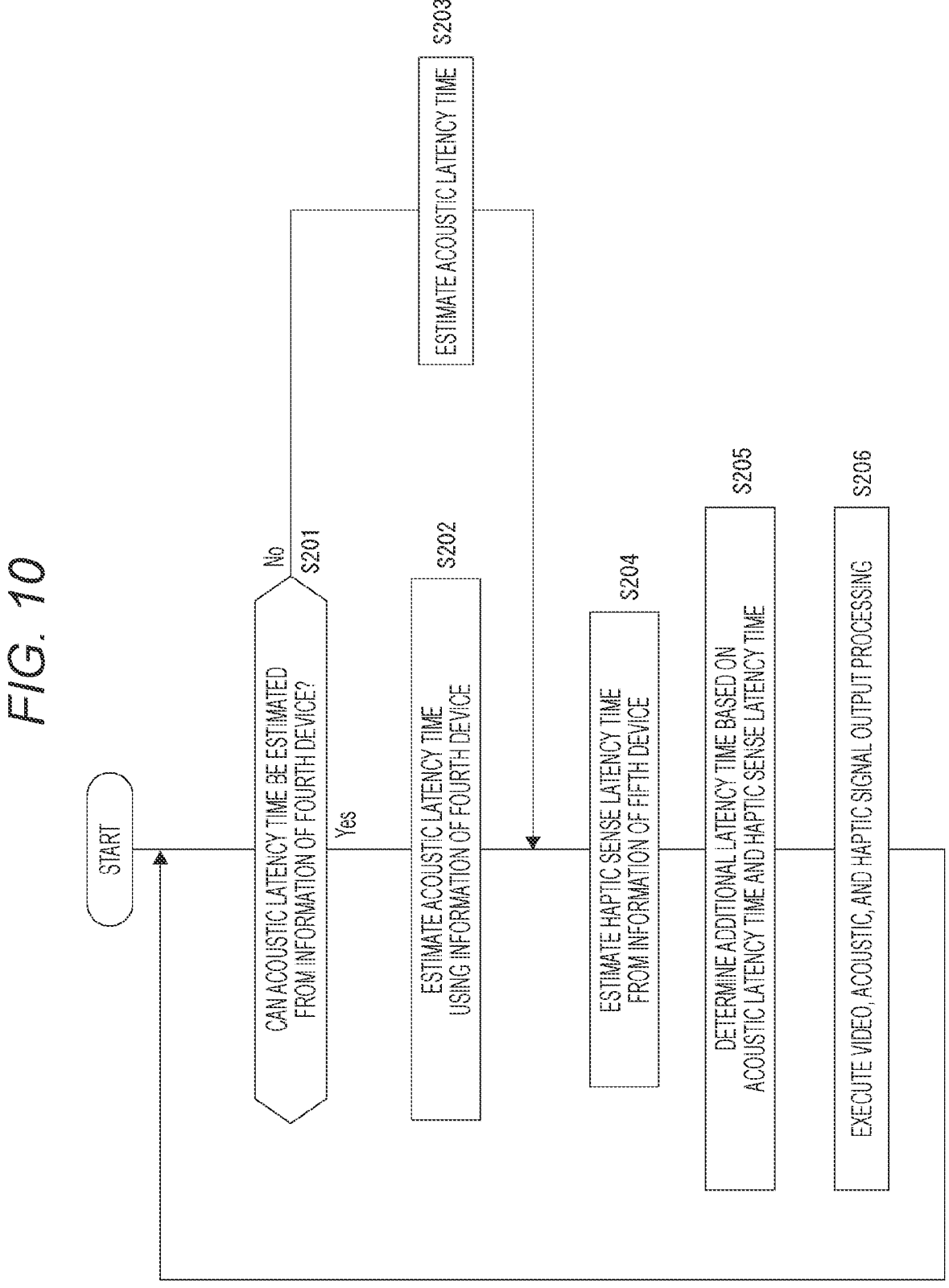
FIG. 10 is a flowchart illustrating an exemplary flow of a process executed by a control unit according to the second embodiment.

An exemplary process to be executed by the control unit 51 of the third device D3 according to the second embodiment will be described with reference to a flowchart illustrated in FIG. 10.

In step S201, the control unit 51 determines whether or not the acoustic latency time La may be estimated on the basis of the information of the fourth device D4.

In a case where it is determined that the estimation may be performed, in step S202, the control unit 51 estimates the acoustic latency time La using the information of the fourth device D4.

On the other hand, in a case where it is determined that the estimation may not be performed, in step S203, the control unit 51 estimates the acoustic latency time La without using the information of the fourth device D4. For example, the acoustic latency time La is estimated using the average value or median value of the latency times, a default delay time prepared in advance in preparation for a case where the estimation based on the device information may not be performed, or the like.

After the acoustic latency time La is estimated by the processing of either step S202 or step S203, in step S204, the control unit 51 estimates the haptic sense latency time Lh using the information of the fifth device D5. Note that, in a case where the estimation using the information of the fifth device D5 may not be performed, a default value or the like may be used.

In step S205, the control unit 51 determines the additional latency time Lh' on the basis of the acoustic latency time La and the haptic sense latency time Lh.

Subsequently, in step S206, the control unit 51 executes output processing of each of the video signal Sv, the acoustic signal Sa, and the haptic signal Sh.

With this arrangement, it becomes possible to perform appropriate video presentation, acoustic presentation, and haptic sense presentation at appropriate timing according to the various estimated latency times L and the determined additional latency time Lh'.

8. Variations

While the exemplary case where the video presentation, the acoustic presentation, and the haptic sense presentation are performed on the basis of the video signal Sv, the acoustic signal Sa, and the haptic signal Sh have been described in the example described above, a content reproduction system 1B may perform the acoustic presentation and the haptic sense presentation on the basis of the acoustic signal Sa and the haptic signal Sh. In other words, the content reproduction system 1B does not perform the video presentation based on the video signal Sv.

Examples of such a mode include a case of enjoying a vibration stimulus generated in accordance with music while listening to the music.

In the content reproduction system 1B, the delay control unit 33 illustrated in FIG. 2 outputs the acoustic signal Sa for the acoustic presentation.

Furthermore, the estimation processing unit 31 estimates the acoustic latency time La by specifying the acoustic codec used for transmission/reception of the acoustic signal Sa.

Moreover, the latency time determination unit 32 determines the additional latency time Lh' on the basis of the estimated acoustic latency time La.

In this manner, in the content reproduction system 1B, the haptic sense presentation in synchronization with the acoustic presentation may be performed without actually measuring the acoustic latency time La.

Note that, in the example described above, the exemplary case where the haptic sense presentation is delayed so that the timing of the haptic sense presentation with respect to the acoustic presentation does not become unnatural has been described.

However, it is not limited thereto in a case where the content to be provided to the viewer/listener is related to e-sports. That is, the control unit 13 or the control unit 51 may determine whether or not the content to be provided to the viewer/listener is related to e-sports, and the latency time determination unit 32 may determine the additional latency time Lh' to be 0 msec in a case where it is determined to be related to e-sports.

That is, all of the video, the audio, and the haptic sense are provided to a game operator, who is the viewer/listener, as quickly as possible. With this arrangement, feedback of various stimuli corresponding the game operation by the operator is quickly performed, and an effect of quickly performing the next operation and an effect of reducing operation errors may be exerted.

In the haptic sense presentation using the vibrator, it may take a time corresponding to several wavelengths to vibrate at predetermined intensity in a case of being vibrated with a sine wave of a resonance frequency of an actuator. In such a case, the haptic sense latency time Lh may be estimated in consideration of the time corresponding to the several wavelengths.

The technology described above may also be applied to a mode in which the video is output from a projector device and the audio and the vibration are output from a smartphone. Furthermore, it is also applicable to a case where the projector device is configured to output not only the video but also the audio.

Note that, in the example described above, the case where the various latency times L are estimated to be 0 msec has been described. This is merely setting "0 msec" as the estimated value without actually performing the processing for estimating the latency time L although the wording describes "estimation". Therefore, the above description of "estimated to be 0 msec" may be rephrased as "0 msec is set as an estimated value". That is, the configuration of setting 0 msec without estimating the latency time L in a case where a certain condition is satisfied is merely one embodiment of the technology described above.

Since the processing of setting 0 msec as the estimated value requires a smaller amount of calculation as compared with the case of obtaining a numerical value other than 0 msec as the estimated value by actually performing estimation processing, it becomes possible to reduce the processing load.

The delay control performed by the delay control unit 33 may be implemented by software, or may be implemented by hardware such as a delay circuit.

Furthermore, a device that performs both the acoustic presentation and the haptic sense presentation and receives signals thereof transmitted from another device by wire or wirelessly is considered, such as a headphone having a vibration function or a game controller having an audio and vibration output function, for example.

In such a device, in a case where the audio and the vibration are transmitted using the same codec, they enter a state of being synchronized with each other, which is preferable.

On the other hand, in a case where the respective signals are transmitted using different codecs, it is necessary to consider synchronization between the both signals. For example, when the acoustic codec is switched from the low-latency codec B to the high-latency codec A, the system, the transmission device, or the codec may detect the switching to switch the codec of the haptic sense transmission side to a codec having a closer latency time in a ganged manner, or the additional latency time Lh' for the haptic sense may be given by the system, the transmission device, or the codec, whereby a high-quality user experience may be achieved.

Furthermore, it is also conceivable to introduce such a mechanism by incorporating such a mechanism into a codec, a transmission scheme, or a file format standard.

The combination of the video and the haptic sense, and the combination of the video and the audio are considered in a similar manner.

Furthermore, in the descriptions above, the method of estimating the latency time from the codec of the acoustic signal and controlling the latency time of the haptic signal according to the estimation has been mainly described. Considering the fact that the haptic signal is also transmitted by a certain codec, for example, an embodiment is conceivable in which the latency time of the haptic signal is estimated from codec information of wireless transmission of the haptic signal and the latency time of the acoustic signal is controlled accordingly in a case where the haptic signal is wirelessly transmitted to a main body device and the acoustic signal is transmitted to an external device by wire as in a game controller.

9. Conclusion

As described in the individual examples described above, the information processing apparatus according to the present technology (first device D1 in the first embodiment and third device D3 in the second embodiment) includes the estimation processing unit 31 that estimates at least some of the video latency time Lv from the reproduction instruction of the video signal Sv to the video presentation based on the video signal Sv, the acoustic latency time La from the reproduction instruction of the acoustic signal Sa to the acoustic presentation based on the acoustic signal Sa, and the haptic sense latency time Lh from the reproduction instruction of the haptic signal Sh to the haptic sense presentation based on the haptic signal Sh, and the latency time determination unit 32 that determines the additional latency time Lh' related to the haptic sense presentation on the basis of the video latency time Lv, the acoustic latency time La, and the haptic sense latency time Lh.

The acoustic presentation and the haptic sense presentation may cause a viewer/listener to feel discomfort depending on a time lag and order thereof. In order to eliminate or suppress such discomfort, it is conceivable to provide a temporal difference between the output timing of the acoustic signal Sa and the output timing of the haptic signal Sh.

By determining this temporal difference as the additional latency time Lh', it becomes possible to keep the time lag and the order of the acoustic presentation and the haptic sense presentation within a predetermined range. For example, it becomes possible to make an adjustment such that the acoustic presentation and the haptic sense presentation occur with a predetermined time lag. Therefore, content reproduction with no discomfort for the viewer/ listener may be carried out. In addition, it becomes possible to avoid reduction of fun and immersion feeling of the content.

Furthermore, since the time lag between the video presentation and the haptic sense presentation may be kept within a predetermined range, it becomes possible to provide a user experience with less discomfort.

As described with reference to FIG. 2 and the like, the information processing apparatus (first device D1 in the first embodiment and third device D3 in the second embodiment) may include the delay control unit 33 that performs delay control of the haptic signal Sh on the basis of the additional latency time Lh'.

With this arrangement, it becomes possible to output the haptic signal Sh such that the viewer/listener may feel the visual stimulus based on the video, the auditory stimulus based on the audio, and the haptic stimulus based on the vibration with a predetermined time lag.

Therefore, a high-quality user experience that does not cause discomfort may be provided.

As described above, the acoustic latency time La may include a communication latency time between the acoustic signal output device DAA that outputs the acoustic signal Sa and the acoustic presentation device DAB that performs the acoustic presentation based on the acoustic signal Sa.

Even if the device that outputs the acoustic signal Sa and the device that performs the acoustic presentation are different devices, it becomes possible to make an adjustment such that the acoustic presentation and the haptic sense presentation occur with a predetermined time lag.

Therefore, the acoustic presentation and the haptic sense presentation may be carried out for the viewer/listener without causing discomfort, which may improve the quality of the experience of the viewer/listener.

As described with reference to FIG. 4 and the like, the latency time determination unit 32 of the information processing apparatus (first device D1 in the first embodiment and third device D3 in the second embodiment) may determine the additional latency time Lh' such that the haptic sense presentation based on the haptic signal Sh is performed after the acoustic presentation based on the acoustic signal Sa.

In a case where there is a time lag between the acoustic presentation based on the acoustic signal Sa and the haptic sense presentation based on the haptic signal Sh, it is preferable that the haptic sense presentation is performed after the acoustic presentation.

This is because a situation where the acoustic presentation is performed after the haptic sense presentation is generally unexperienced unlike the situation where the haptic sense presentation is performed after the acoustic presentation, and it is highly likely that the discomfort is caused.

Therefore, by determining the additional latency time Lh' such that the haptic sense presentation is performed after the acoustic presentation, it becomes possible to improve the quality of the experience of the viewer/listener.

As described above, the latency time determination unit 32 of the information processing apparatus (first device D1 in the first embodiment and third device D3 in the second embodiment) may determine the additional latency time Lh' such that the haptic sense presentation based on the haptic signal Sh is performed before the first time T1 elapses from the acoustic presentation based on the acoustic signal Sa.

As the haptic sense presentation based on the haptic signal Sh is delayed with respect to the acoustic presentation based on the acoustic signal Sa, the viewer/listener tends to feel discomfort. According to the present configuration, the haptic sense presentation is performed before the first time T1 elapses from the acoustic presentation, whereby it becomes possible to make the viewer/listener less likely to feel discomfort, and to reduce the discomfort felt by the viewer/listener.

Therefore, the quality of the user experience of the viewer/listener may be improved.

As described above, the latency time determination unit 32 of the information processing apparatus (first device D1 in the first embodiment and third device D3 in the second embodiment) may determine the additional latency time Lh' such that the haptic sense presentation based on the haptic signal Sh is performed before the second time T2 elapses from the video presentation based on the video signal Sv.

With this arrangement, it becomes possible to avoid an excessively long time period between the video presentation and the haptic sense presentation.

That is, it becomes possible to provide a user experience with a sense of unity such that the relevance between a video depiction such as impact generated in a scene visually recognized by the viewer/listener by the video presentation and the haptic sense presentation caused by the video depiction is not interrupted.

As described with reference to FIGS. 2, 5, and the like, the estimation processing unit 31 of the information processing apparatus (first device D1 in the first embodiment and third device D3 in the second embodiment) may estimate the acoustic latency time La.

While the acoustic latency time La is only required to be measurable, the acoustic latency time La may not be measured depending on the environment. In such a case, by estimating the acoustic latency time La, it becomes possible to increase the possibility that the acoustic presentation and the haptic sense presentation are carried out for the viewer/listener without causing discomfort.

As described with reference to FIG. 5 and the like, the estimation processing unit 31 of the information processing apparatus (first device D1 in the first embodiment and third device D3 in the second embodiment) may estimate the acoustic latency time La on the basis of information regarding a codec used for the acoustic presentation.

The acoustic latency time La may be estimated depending on a type of the codec.

By performing such estimation, it becomes possible to optimize the timing of the haptic sense presentation, and to increase the possibility that the acoustic presentation and the haptic sense presentation are carried out for the viewer/listener without causing discomfort.

As described above, the estimation processing unit 31 of the information processing apparatus (first device D1 in the first embodiment and third device D3 in the second embodiment) may specify the codec information (type of the acoustic codec) on the basis of information regarding the specification of the acoustic presentation device DAB that performs the acoustic presentation based on the acoustic signal Sa.

For example, the acoustic latency time La may be estimated by specifying the specification or the like of the acoustic presentation device DAB from a manufacturer, a model number, or the like of the acoustic presentation device DAB.

By performing such estimation, it becomes possible to optimize the timing of the haptic sense presentation, and to increase the possibility that the acoustic presentation and the haptic sense presentation are carried out for the viewer/listener without causing discomfort.

As described above, the estimation processing unit 31 of the information processing apparatus (first device D1 in the first embodiment and third device D3 in the second embodiment) may estimate the acoustic latency time La on the basis of configurations of an acoustic signal output function unit (acoustic signal output device DAA) that outputs the acoustic signal Sa and an acoustic presentation function unit (acoustic presentation device DAB) that performs the acoustic presentation based on the acoustic signal Sa, and may determine the additional latency time Lh' on the basis of configurations of a haptic signal output function unit (haptic signal output device DHA) that outputs the haptic signal Sh and a haptic sense presentation function unit (haptic sense presentation device DHB) that performs the haptic sense presentation based on the haptic signal Sh and the acoustic latency time La.

For example, the configurations of the acoustic signal output device DAA and the acoustic presentation device DAB may be devices different from each other, or may be the same device. Furthermore, in the case of different devices, a communication mode between the devices, such as wired communication or wireless communication, is also one aspect of the configuration.

The estimation processing unit 31 may estimate the acoustic latency time La according to a mode of connection, such as whether the acoustic signal output device DAA and the acoustic presentation device DAB are the same device or different devices, what communication scheme is used, what type of cable is used for connection, and the like, that is, a configuration mode of the acoustic signal output device DAA and the acoustic presentation device DAB.

Furthermore, even in the haptic sense presentation, similar estimation may be performed for the configuration mode of the haptic signal output device DHA and the haptic sense presentation device DHB.

By determining the additional latency time Lh' using those pieces of estimation information, it becomes possible to perform the video presentation, the acoustic presentation, and the haptic sense presentation without causing discomfort to the viewer/listener.

As described with reference to FIG. 6 or the like, the estimation processing unit 31 of the information processing apparatus (first device D1 in the first embodiment and third device D3 in the second embodiment) may estimate the acoustic latency time La in a case where the acoustic signal Sa is transmitted from the acoustic signal output function unit (acoustic signal output device DAA) to the acoustic presentation function unit (acoustic presentation device DAB) by wireless communication.

For example, in a case where communication between the acoustic signal output device DAA and the acoustic presentation device DAB is performed by wire, the acoustic latency time La is considered to be negligibly small. Therefore, in such a case, the acoustic latency time La is not estimated or the acoustic latency time La is estimated (set) to be 0 msec, whereby the processing load of the estimation processing unit 31 may be reduced.

As described with reference to FIG. 2 and the like, the estimation processing unit 31 of the information processing apparatus (first device D1 in the first embodiment and third device D3 in the second embodiment) may estimate the video latency time Lv.

By estimating the video latency time Lv appropriately, it becomes possible to estimate appropriate timing of the haptic sense presentation.

Therefore, it becomes possible to perform the haptic sense presentation at appropriate timing in conjunction with the video presentation, and to provide a high-quality user experience without discomfort.

As described above, the estimation processing unit 31 of the information processing apparatus (first device D1 in the first embodiment and third device D3 in the second embodiment) may estimate the video latency time Lv on the basis of configurations of a video signal output function unit (video signal output device DVA) that outputs the video signal Sv and a video presentation function unit (video presentation device DVB) that performs the video presentation based on the video signal Sv.

Various configurations of the video signal output device DVA and the video presentation device DVB may be conceivable. For example, the video signal output device DVA and the video presentation device DVB may be different devices, or may be the same device.

Furthermore, in the case of different devices, there is a difference in a communication scheme or codec between the devices.

The estimation processing unit 31 may estimate the video latency time Lv according to a configuration mode such as whether the video signal output device DVA and the video presentation device DVB are the same device or different devices, what communication scheme is used, what type of cable is used for connection, and the like.

By determining the additional latency time Lh' according to the estimated video latency time Lv, it becomes possible to perform the video presentation, the acoustic presentation, and the haptic sense presentation without causing discomfort to the viewer/listener.

The content reproduction system 1 (1A, 1B) as an information processing system includes at least two devices, in which one of the devices (first device D1, third device D3) may include the delay control unit 33 that outputs the video signal Sv, the acoustic signal Sa, and the haptic signal Sh, the estimation processing unit 31 that estimates at least some of the video latency time Lv from the reproduction instruction of the video signal Sv to the video presentation based on the video signal Sv, the acoustic latency time La from the reproduction instruction of the acoustic signal Sa to the acoustic presentation based on the acoustic signal Sa, and the haptic sense latency time Lh from the reproduction instruction of the haptic signal Sh to the haptic sense presentation based on the haptic signal Sh, and the latency time determination unit 32 that determines the additional latency time Lh' related to the haptic sense presentation on the basis of an estimation result of the estimation processing unit 31, and another one of the devices (second device D2, fifth device D5) may include the acoustic presentation processing unit 41 that performs the acoustic presentation corresponding to the output of the acoustic signal Sa.

As described in the first embodiment with reference to FIGS. 1 and 2, in the content reproduction system 1 (1A, 1B) as the information processing system, one (first device D1) may function as the video signal output device DVA that outputs the video signal Sv, the video presentation device DVB that performs the video presentation based on the video signal Sv, the haptic signal output device DHA that outputs the haptic signal Sh, the haptic sense presentation device DHB that performs the haptic sense presentation based on the haptic signal Sh, and the acoustic signal output device DAA that outputs the acoustic signal Sa, and the other device (second device D2) may function as the acoustic presentation device DAB that performs the acoustic presentation based on the acoustic signal Sa.

For example, an embodiment is conceivable in which a mobile terminal, such as a smartphone, a tablet, or the like, outputs the video signal Sv, the haptic signal Sh, and the acoustic signal Sa, and performs the video presentation and the haptic sense presentation based on the video signal Sv and the haptic signal Sh, and a headphone or an earphone connected to the mobile terminal by wire or wirelessly performs the acoustic presentation.

In such an embodiment, the haptic sense presentation may be performed at appropriate timing according to the video presentation or the acoustic presentation.

As described in the second embodiment with reference to FIGS. 7, 8, and the like, in the content reproduction system 1 (1A, 1B) as the information processing system, one of the devices (third device D3) may function as the video signal output device DVA that outputs the video signal Sv, the haptic signal output device DHA that outputs the haptic signal Sh, and the acoustic signal output device DAA that outputs the acoustic signal Sa, and another one of the devices (fifth device D5) may function as the haptic sense presentation device DHB that performs the haptic sense presentation based on the haptic signal Sh, and still another device (second device D2) that functions as the video presentation device DVB that performs the video presentation based on the video signal Sv and the acoustic presentation device DAB that performs the acoustic presentation based on the acoustic signal Sa may be further included.

For example, an embodiment is conceivable in which a game machine body outputs the video signal Sv, the acoustic signal Sa, and the haptic signal Sh, a monitor device connected to the game machine body performs the video presentation and the acoustic presentation, and a game controller connected to the game machine body performs the haptic sense presentation.

In such an embodiment, the haptic sense presentation may be performed at appropriate timing according to the video presentation or the acoustic presentation. That is, the additional latency time may be determined such that the haptic sense presentation by the game controller is performed at appropriate timing according to the connection mode between the game machine body and the monitor device.

The information processing method executed by the information processing apparatus (first device D1 in the first embodiment and third device D3 in the second embodiment) causes a computer device to execute the estimation processing of estimating at least some of the video latency time Lv from the reproduction instruction of the video signal Sv to the video presentation based on the video signal Sv, the acoustic latency time La from the reproduction instruction of the acoustic signal Sa to the acoustic presentation based on the acoustic signal Sa, and the haptic sense latency time Lh from the reproduction instruction of the haptic signal Sh to the haptic sense presentation based on the haptic signal Sh, and the processing of determining the additional latency time Lh' related to the haptic sense presentation on the basis of the video latency time Lv, the acoustic latency time La, and the haptic sense latency time Lh.

According to such an information processing method, it becomes possible to implement the first device D1 and the third device D3 described above by an arithmetic processing device such as a microcomputer.

The program to be executed by the first device D1 and the third device D3 may be recorded in advance in a hard disk drive (HDD) as a storage medium built in a device such as a computer device, a ROM in a microcomputer including a CPU, or the like. Alternatively, the program may be temporarily or permanently stored (recorded) in a removable storage medium such as a flexible disc, a compact disc read only memory (CD-ROM), a magneto optical (MO) disc, a digital versatile disc (DVD), a Blu-ray disc, a magnetic disc, a semiconductor memory, a memory card, or the like. Such a removable storage medium may be provided as what is called package software.

Furthermore, such a program may be installed from the removable storage medium into a personal computer or the like, or may be downloaded from a download site via a network such as a local area network (LAN), the Internet, or the like.

Note that the effects described in the present specification are merely examples and are not limited, and other effects may be exerted.

Furthermore, individual examples described above may be combined in any way, and the various functions and effects described above may be obtained even in a case where various combinations are used.

10. Present Technology

The present technology may also adopt the following configurations.

(1)
An information processing apparatus including:
an estimation processing unit that estimates at least some of a video latency time from a reproduction instruction of a video signal to video presentation based on the video signal, an acoustic latency time from a reproduction instruction of an acoustic signal to acoustic presentation based on the acoustic signal, and a haptic sense latency time from a reproduction instruction of a haptic signal to haptic sense presentation based on the haptic signal; and
a latency time determination unit that determines an additional latency time related to the haptic sense presentation on the basis of the video latency time, the acoustic latency time, and the haptic sense latency time.

(2)
The information processing apparatus according to (1) described above, further including:
a delay control unit that performs delay control of the haptic signal on the basis of the additional latency time.

(3)
The information processing apparatus according to (1) or (2) described above, in which
the acoustic latency time includes a communication latency time between an acoustic signal output device that outputs the acoustic signal and an acoustic presentation device that performs the acoustic presentation based on the acoustic signal.

(4)
The information processing apparatus according to any one of (1) to (3) described above, in which
the latency time determination unit determines the additional latency time such that the haptic sense presentation based on the haptic signal is performed after the acoustic presentation based on the acoustic signal.

(5)
The information processing apparatus according to (4) described above, in which
the latency time determination unit determines the additional latency time such that the haptic sense presentation based on the haptic signal is performed before a first time elapses from the acoustic presentation based on the acoustic signal.

(6)

The information processing apparatus according to any one of (1) to (5) described above, in which the latency time determination unit determines the additional latency time such that the haptic sense presentation based on the haptic signal is performed before a second time elapses from the video presentation based on the video signal.

(7)

The information processing apparatus according to any one of (1) to (6) described above, in which the estimation processing unit estimates the acoustic latency time.

(8)

The information processing apparatus according to (7) described above, in which the estimation processing unit estimates the acoustic latency time on the basis of information regarding a codec used for the acoustic presentation.

(9)

The information processing apparatus according to (7) or (8) described above, in which the estimation processing unit specifies information regarding a codec on the basis of information regarding a specification of an acoustic presentation device that performs the acoustic presentation based on the acoustic signal.

(10)

The information processing apparatus according to any one of (7) to (9) described above, in which the estimation processing unit is configured to:

estimate the acoustic latency time on the basis of a configuration of an acoustic signal output function unit that outputs the acoustic signal and an acoustic presentation function unit that performs the acoustic presentation based on the acoustic signal; and determine the additional latency time on the basis of a configuration of a haptic signal output function unit that outputs the haptic signal and a haptic sense presentation function unit that performs the haptic sense presentation based on the haptic signal and the acoustic latency time.

(11)

The information processing apparatus according to (10) described above, in which the estimation processing unit estimates the acoustic latency time in a case where the acoustic signal is transmitted from the acoustic signal output function unit to the acoustic presentation function unit by wireless communication.

(12)

The information processing apparatus according to any one of (1) to (11) described above, in which the estimation processing unit estimates the video latency time.

(13)

The information processing apparatus according to (12) described above, in which the estimation processing unit estimates the video latency time on the basis of a configuration of a video signal output function unit that outputs the video signal and a video presentation function unit that performs the video presentation based on the video signal.

(14)

An information processing method that causes a computer device to perform:

estimation processing that estimates at least some of a video latency time from a reproduction instruction of a video signal to video presentation based on the video signal, an acoustic latency time from a reproduction instruction of an acoustic signal to acoustic presentation based on the acoustic signal, and a haptic sense latency time from a reproduction instruction of a haptic signal to haptic sense presentation based on the haptic signal; and processing that determines an additional latency time related to the haptic sense presentation on the basis of the video latency time, the acoustic latency time, and the haptic sense latency time.

(15)

An information processing system including:

a first information processing apparatus; and a second information processing apparatus, in which the first information processing apparatus includes:

an estimation processing unit that estimates at least some of a video latency time from a reproduction instruction of a video signal to video presentation based on the video signal, an acoustic latency time from a reproduction instruction of an acoustic signal to acoustic presentation based on the acoustic signal, and a haptic sense latency time from a reproduction instruction of a haptic signal to haptic sense presentation based on the haptic signal;

a latency time determination unit that determines an additional latency time related to the haptic sense presentation on the basis of the video latency time, the acoustic latency time, and the haptic sense latency time; and a delay control unit that delays the haptic signal according to the additional latency time, and the second information processing apparatus includes an acoustic presentation processing unit that performs the acoustic presentation according to the acoustic signal.

(16)

The information processing system according to (15) described above, in which the first information processing apparatus functions as a video signal output device that outputs the video signal, a video presentation device that performs the video presentation based on the video signal, a haptic signal output device that outputs the haptic signal, a haptic sense presentation device that performs the haptic sense presentation based on the haptic signal, and an acoustic signal output device that outputs the acoustic signal, and the second information processing apparatus functions as an acoustic presentation device that performs the acoustic presentation based on the acoustic signal.

(17)

The information processing system according to (15) described above, further including:

a third information processing apparatus that functions as a video presentation device that performs the video presentation based on the video signal and an acoustic presentation device that performs the acoustic presentation based on the acoustic signal, in which the first information processing apparatus functions as a video signal output device that outputs the video signal, a haptic signal output device that outputs the haptic signal, and an acoustic signal output device that outputs the acoustic signal, and the second information processing apparatus functions as a haptic sense presentation device that performs the haptic sense presentation based on the haptic signal.

REFERENCE SIGNS LIST 1, 1A Content reproduction system
DVA Video signal output device
DVB Video presentation device
DAA Acoustic signal output device
DAB Acoustic presentation device
DHA Haptic signal output device
DHB Haptic sense presentation device
Sv Video signal
Sa Acoustic signal
Sh Haptic signal
D1 First device
D2 Second device
D3 Third device
D4 Fourth device
D5 Fifth device
31 Estimation processing unit
32 Latency time determination unit
33 Delay control unit
41 Acoustic presentation processing unit
L Latency time
Lv Video latency time
La Acoustic latency time
Lh Haptic sense latency time
Lh' Additional latency time
T1 First time
T2 Second time

The invention claimed is:

1. An information processing apparatus comprising:
circuitry configured to
    estimate one or more of a video latency time from a reproduction instruction of a video signal to video presentation based on the video signal, an acoustic latency time from a reproduction instruction of an acoustic signal to acoustic presentation based on the acoustic signal, or a haptic sense latency time from a reproduction instruction of a haptic signal to haptic sense presentation based on the haptic signal, and
    determine an additional latency time related to the haptic sense presentation based on the video latency time, the acoustic latency time, and the haptic sense latency time,
wherein the circuitry determines the additional latency time such that the haptic sense presentation based on the haptic signal is performed after at least one of the video presentation based on the video signal or the acoustic presentation based on the acoustic signal.

2. The information processing apparatus according to claim 1,
wherein the circuitry is further configured to perform delay control of the haptic signal based on the additional latency time.

3. The information processing apparatus according to claim 1,
wherein the acoustic latency time includes a communication latency time between an acoustic signal output device configured to output the acoustic signal and an acoustic presentation device configured to perform the acoustic presentation based on the acoustic signal.

4. The information processing apparatus according to claim 1,
wherein the circuitry determines the additional latency time such that the haptic sense presentation based on the haptic signal is performed after the acoustic presentation based on the acoustic signal.

5. The information processing apparatus according to claim 4,
wherein the circuitry determines the additional latency time such that the haptic sense presentation based on the haptic signal is performed before a first time elapses from the acoustic presentation based on the acoustic signal.

6. The information processing apparatus according to claim 1,
wherein the circuitry determines the additional latency time such that the haptic sense presentation based on the haptic signal is performed before a second time elapses from the video presentation based on the video signal.

7. The information processing apparatus according to claim 1,
wherein the circuitry estimates the acoustic latency time.

8. The information processing apparatus according to claim 7,
wherein the circuitry estimates the acoustic latency time based on information regarding a codec used for the acoustic presentation.

9. The information processing apparatus according to claim 7,
wherein the circuitry is further configured to specify specifies information regarding a codec based on information regarding a specification of an acoustic presentation device that performs the acoustic presentation based on the acoustic signal.

10. The information processing apparatus according to claim 7,
wherein the circuitry estimates the acoustic latency time based on a configuration of circuitry configured to output the acoustic signal and perform the acoustic presentation based on the acoustic signal, and
wherein the circuitry determines the additional latency time based on a configuration of circuitry configured to output the haptic signal and perform the haptic sense presentation based on the haptic signal and the acoustic latency time.

11. The information processing apparatus according to claim 10,
wherein the circuitry estimates the acoustic latency time in a case where the acoustic signal is transmitted from the circuitry configured to output the acoustic signal by wireless communication.

12. The information processing apparatus according to claim 1,
wherein the circuitry estimates the video latency time.

13. The information processing apparatus according to claim 12,
wherein the circuitry estimates the video latency time based on a configuration of circuitry configured to output the video signal and perform the video presentation based on the video signal.

14. An information processing method, executed by a computer device, the method comprising:
    estimating one or more of a video latency time from a reproduction instruction of a video signal to video presentation based on the video signal, an acoustic latency time from a reproduction instruction of an acoustic signal to acoustic presentation based on the acoustic signal, or a haptic sense latency time from a reproduction instruction of a haptic signal to haptic sense presentation based on the haptic signal; and determining an additional latency time related to the haptic sense presentation based on the video latency time, the acoustic latency time, and the haptic sense latency time, wherein the additional latency time is determined such that the haptic sense presentation based on the haptic signal is performed after at least one of the video presentation based on the video signal or the acoustic presentation based on the acoustic signal.

15. An information processing system comprising:

a plurality of devices, wherein a first device of the plurality of devices includes first circuitry configured to estimate one or more of a video latency time from a reproduction instruction of a video signal to video presentation based on the video signal, an acoustic latency time from a reproduction instruction of an acoustic signal to acoustic presentation based on the acoustic signal, or a haptic sense latency time from a reproduction instruction of a haptic signal to haptic sense presentation based on the haptic signal, determine an additional latency time related to the haptic sense presentation based on the video latency time, the acoustic latency time, and the haptic sense latency time, and delay the haptic signal according to the additional latency time, wherein a second device of the plurality of devices includes second circuitry configured to perform the acoustic presentation according to the acoustic signal, and wherein the first circuitry determines the additional latency time such that the haptic sense presentation based on the haptic signal is performed after at least one of the video presentation based on the video signal or the acoustic presentation based on the acoustic signal.

16. The information processing system according to claim 15, wherein the first device functions as a video signal output device that outputs the video signal, a video presentation device that performs the video presentation based on the video signal, a haptic signal output device that outputs the haptic signal, a haptic sense presentation device that performs the haptic sense presentation based on the haptic signal, and an acoustic signal output device that outputs the acoustic signal, and wherein the another second device functions as an acoustic presentation device that performs the acoustic presentation based on the acoustic signal.

17. The information processing system according to claim 15, wherein a third device of the plurality of devices functions as a video presentation device that performs the video presentation based on the video signal and an acoustic presentation device that performs the acoustic presentation based on the acoustic signal, wherein the first device functions as a video signal output device that outputs the video signal, a haptic signal output device that outputs the haptic signal, and an acoustic signal output device that outputs the acoustic signal, and wherein the second device functions as a haptic sense presentation device that performs the haptic sense presentation based on the haptic signal.

* * * * *